US008627449B2

(12) United States Patent
Parla et al.

(10) Patent No.: US 8,627,449 B2
(45) Date of Patent: Jan. 7, 2014

(54) DYNAMIC TUNNELING OVER VIRTUAL PRIVATE NETWORK CONNECTIONS BASED ON NETWORK CONDITIONS

(75) Inventors: Vincent Parla, North Hampton, NH (US); Todd Short, Sudbury, MA (US); Marc Tardif, Franklin, MA (US); David Brownhill, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 13/039,550

(22) Filed: Mar. 3, 2011

(65) Prior Publication Data

US 2012/0227102 A1    Sep. 6, 2012

(51) Int. Cl.
*H04L 29/06* (2006.01)

(52) U.S. Cl.
USPC ...... 726/15; 726/2; 726/3; 713/150; 713/151; 709/227; 709/228; 709/229; 709/230

(58) Field of Classification Search
USPC .......................................................... 726/15
See application file for complete search history.

(56) References Cited

U.S. PATENT DOCUMENTS

| 6,438,127 | B1 * | 8/2002 | Le Goff et al. ............... 370/389 |
| 6,438,603 | B1 | 8/2002 | Ogus |
| 6,463,061 | B1 * | 10/2002 | Rekhter et al. ............... 370/392 |
| 6,543,005 | B1 | 4/2003 | Bamford |
| 6,898,729 | B2 | 5/2005 | Virolainen et al. |
| 7,072,309 | B2 | 7/2006 | Xie et al. |
| 7,478,427 | B2 * | 1/2009 | Mukherjee et al. ............ 726/15 |
| 7,716,731 | B2 | 5/2010 | Short et al. |
| 8,316,226 | B1 * | 11/2012 | Kshirsagar et al. ........... 713/150 |
| 2004/0221004 | A1 | 11/2004 | Chalfin et al. |
| 2006/0206705 | A1 | 9/2006 | Khosravi |
| 2007/0094723 | A1 * | 4/2007 | Short et al. ...................... 726/14 |

OTHER PUBLICATIONS

Diab, Wafaa Bou, Samir Tohme, and Carole Bassil. "Critical VPN Security Analysis and New Approach for Securing VoIP Communications over VPN Networks." WMuNeP'07, Oct. 22, 2007, Chania, Crete Island, Greece. Copyright 2007 ACM 978-1-59593-804-6/07/0010.*
J. Salowey et al., "Transport Layer Security (TLS) Session Resumption without Server-Side State", Network Working Group, RFC 5077, Jan. 2008, pp. 1-21.

* cited by examiner

*Primary Examiner* — Taghi Arani
*Assistant Examiner* — Narciso Victoria
(74) *Attorney, Agent, or Firm* — Edell, Shapiro & Finnan, LLC

(57) ABSTRACT

Techniques are provided for transmitting data securely across virtual private network (VPN) connections. A first VPN connection is initiated between a first device and a second device. The second device selects a first communication protocol to be used for the first VPN connection with the first device. The first device generates session identification data associated with the first VPN connection and sends the session identification data to the second device over the first VPN. The second device receives the session identification data and stores it. The second device determines when the first VPN connection has been disrupted. The second device then selects a second communication protocol and initiates a second VPN connection using the second communication protocol with the first device. The second device transmits the session identification data to the first device, and the first device associates the second VPN connection with the first VPN connection using session identification data.

18 Claims, 5 Drawing Sheets

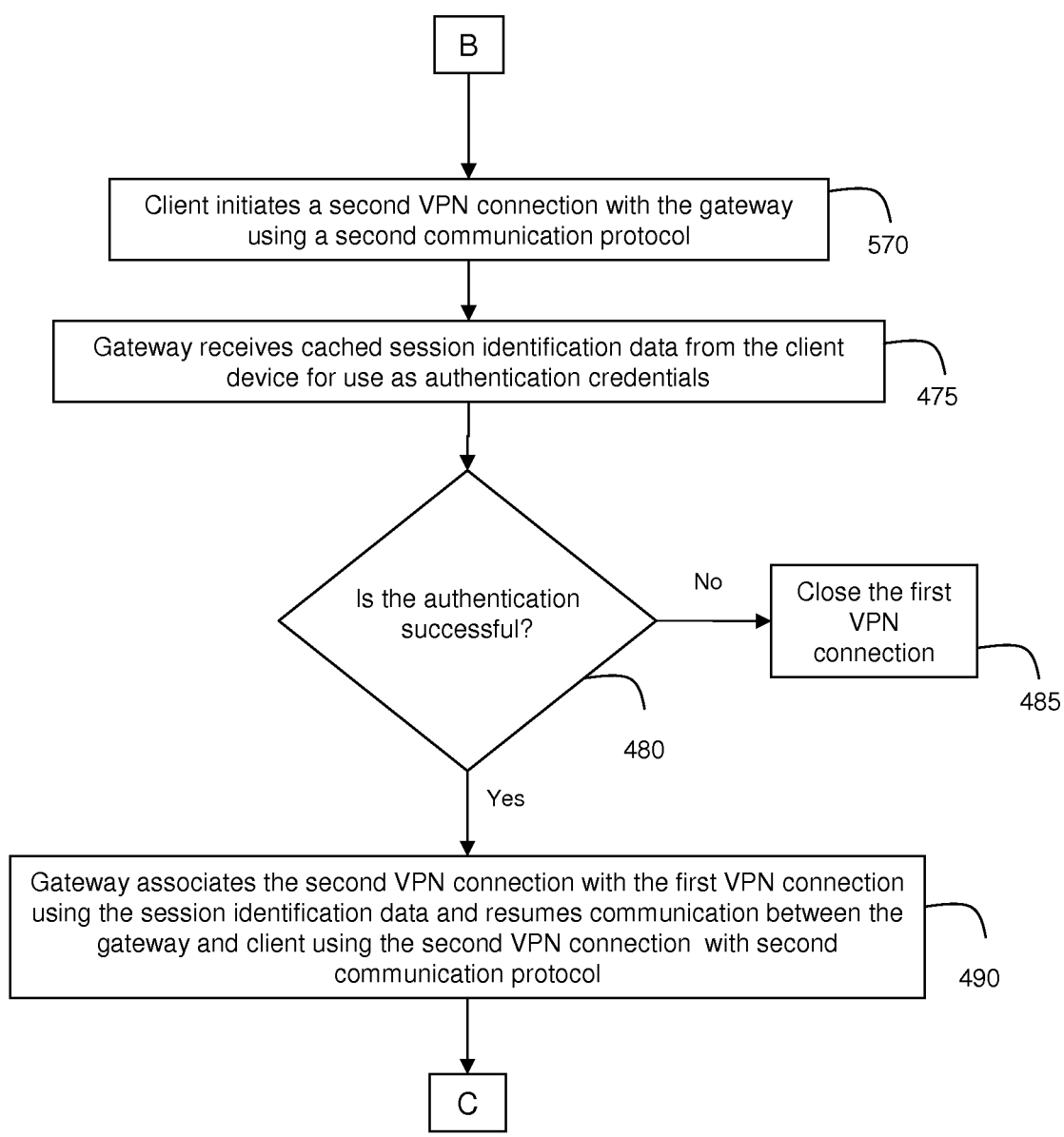

DYNAMIC TUNNELING OVER VIRTUAL PRIVATE NETWORK CONNECTIONS BASED ON NETWORK CONDITIONS

TECHNICAL FIELD

The present disclosure relates to network sessions, and more particularly to maintaining network connectivity between devices.

BACKGROUND

Virtual Private Networks (VPNs) permit secure access to network resources and allow for network users to connect to a network remotely through firewalls and proxies. Network clients are able to connect through firewalls and proxies because VPNs use the same protocols that are used for Internet access.

VPN connections between users and the network can be disrupted, degrading communications between the user and the network resources. Re-establishing the VPN connection, when possible, can be helpful. For example, when wireless devices (e.g., mobile computers, cellular phones, personal data assistant devices, etc.) roam between wireless networks or switch from wired to wireless networks, re-establishing the VPN connection allows users to maintain continuous data communications with the network. Frequently, however, VPN connections cannot be re-established due to failures of the communication protocols that are used to establish the connectivity.

BRIEF DESCRIPTION OF THE DRAWINGS

FIGS. 4A and 4B illustrate a flow chart depicting operations of the gateway device and the client device in accordance with the techniques described herein.

DESCRIPTION OF EXAMPLE EMBODIMENTS

Overview

Techniques are provided for transmitting data securely across virtual private network (VPN) connections. A first VPN connection is initiated between a first device and a second device. The second device selects a first communication protocol to be used for the first VPN connection with the first device. The first device generates session identification data associated with the first VPN connection and sends the session identification data to the second device over the first VPN. The second device receives the session identification data and stores it. The second device determines when the first VPN connection has been disrupted. The second device then selects a second communication protocol and initiates a second VPN connection using the second communication protocol with the first device. The second device transmits the session identification data to the first device, and the first device associates the second VPN connection with the first VPN connection using session identification data. In one example, the first device is a gateway device and the second device is a client device.

Example Embodiments

Figure 1:
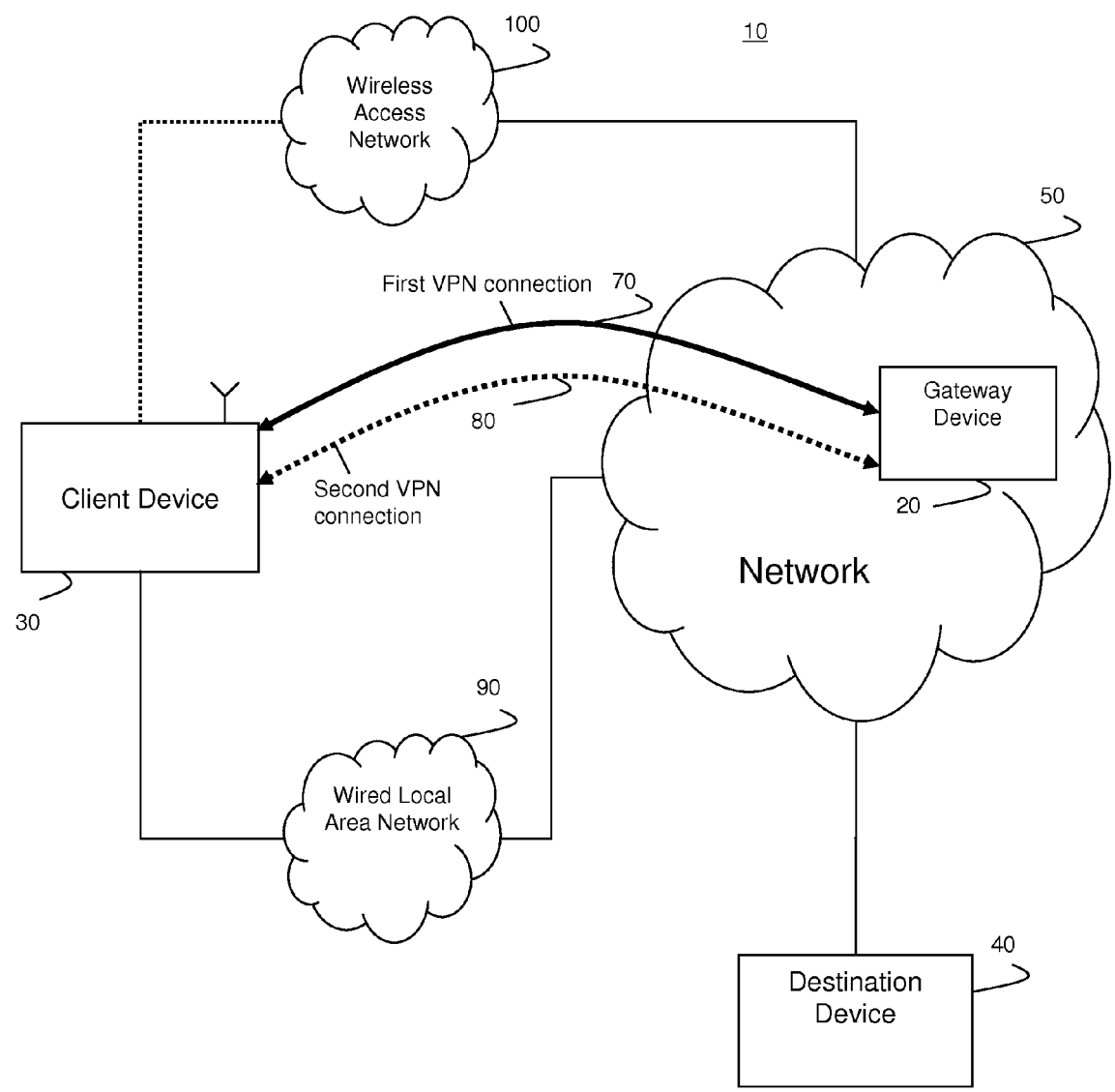
FIG. 1 shows an example of a network environment featuring multiple virtual private network (VPN) connections between a client device and a gateway device within a VPN.

FIG. 1 shows an example of a network environment 10 featuring a gateway device 20 configured to manage network connectivity between a client device 30 and a destination device 40. The gateway device 20 may reside in a network 50 that comprises a wide area network, e.g., the Internet, and any number of local area networks. In general, in network environment 10, client device 30 can access the gateway device 20 in network 50 through one of a plurality of VPN connections. For example, in FIG. 1, client device 30 can connect with the gateway device 20 in network 50 using a first VPN connection 70. In the instance that communication using the first VPN connection 70 is disrupted, the client device 30 can initiate a second VPN connection 80 with the gateway device 20. The client device 30 may be any device with network connectivity, including a personal computer (desktop or laptop), hand-held computing device (Smartphone or tablet computer), virtual machine running in a cloud computing environment, etc.

The client device 30 may connect to the network 50 using, for example, a wired connection through a wired local area network 90. In another form, if the client device 30 has wireless network connectivity capabilities, the client device 30 may wirelessly connect with a wireless (local or wide area) access network 100, which is in turn connected to the network 50, to establish a VPN connection with the gateway device 20. In either case, either or both of the first and second VPN connections 70 and 80 may be by way of the wired local area network 90 or wireless access network 100. Furthermore, the client device 30 may roam from the wired network 90 to the wireless network 100 while a VPN connection is active.

As shown in FIG. 1, one or more VPN connections or tunnels are established between client device 30 and gateway device 20. The VPN connections are established using secure protocols that enable secure data communication between the client device 30 and gateway device 20 and ultimately between the client device 30 and the destination device 40. The client device 30 may initiate the first VPN connection 70 and the second VPN connection 80. For example, the client device 30 may first initiate the first VPN connection 70 using a first secure communication protocol and, in response to a disruption of the first VPN connection 70, may initiate the second VPN connection 80 using a second secure communication protocol.

For example, in FIG. 1, the client device 30 may initiate the first VPN connection 70 with gateway device 20 using a Secure Socket Layer (SSL) protocol. If the first VPN connection 70 is disrupted, the client device 30 may initiate the second VPN connection 80 with the gateway device 20 using an Internet Key Exchange (IKE) protocol or IKE version 2 (IKEv2) protocol in the Internet Protocol Security (IPSec) suite for secure IP communications between the client device 30 and the gateway device 20. In general, the VPN connections 70 and 80 operate as secure control channels for data transmission between an authenticated client device 30, gateway device 20 and ultimately the destination device 40.

In one example, the client device 30 may use a Hypertext Transfer Protocol Secure (HTTPS) connection, which may be a hypertext transfer protocol (HTTP) with an SSL or Transport Layer Security (TLS) protocol. This HTTPS connection allows for encrypted communication of data (for example, secure IP communications) between the client device 30 and the gateway device 20. In one example, the client device 30 may be a client device configured with Cisco AnyConnect™ network connectivity capabilities to enable an HTTPS connection.

As is explained further hereinafter, in response to a failure or disruption of the first VPN connection 70 between the client device 30 and gateway device 20, the client device 30 can establish a second VPN connection 80 to maintain the secure data communication between the client device 30, gateway device 20 and destination device 40. The client device 30 may establish the second VPN connection using a second secure communication protocol that is different from the secure protocol used for the first VPN connection. After the client device 30 initiates the second VPN connection with the gateway device 20, the gateway device 20 may utilize session authentication and identification information that was passed between the gateway device 20 and the client device 30 during the first VPN connection to authenticate the client device 30 for the second VPN connection. As a result, the second VPN connection can be established and authenticated autonomously between the gateway device 20 and the client device 30 without requiring user interaction at the client device 30.

Figure 2:
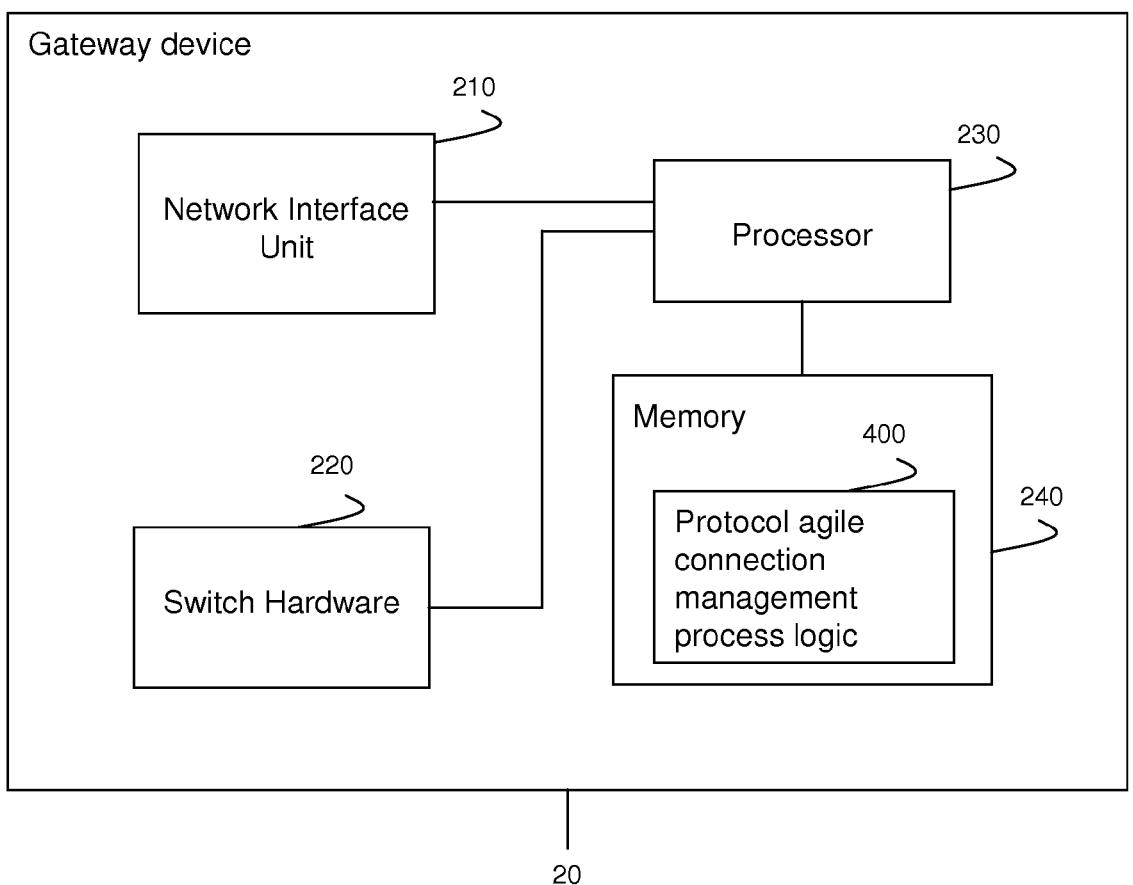
FIG. 2 is an example block diagram of the gateway device that is configured with protocol agile connection management process logic to associate multiple distinct VPN connections having different communication protocols.

Turning to FIG. 2, an example block diagram of the gateway device 20 is now described. In FIG. 2, the gateway device 20 comprises a network interface unit 210, switch hardware 220, processor 230 and memory 240. The network interface unit 210 is configured to enable network communications over network 50. For example, network interface unit 210 is an Ethernet card, and it is also configured to receive secure data communications from the client device 30. The gateway device 20 also contains switch hardware 220, which, in general, allows for gateway 20 to queue packets received from a source device, e.g., client device 20, for ultimately forwarding to a destination, e.g., to destination device 40.

The network interface unit 210 and switch hardware 220 of the gateway device 20 are coupled to processor 230. The processor 230 is a microprocessor or microcontroller that is configured to execute program logic instructions (i.e., software) for carrying out various operations and tasks described herein. For example, the processor 230 is configured to execute the protocol agile connection management process logic 400 that is stored in memory 240. In general, the protocol agile connection management process logic 400 enables processor 230 to generate session identification data associated with a first VPN connection, send the session identification data to the client device over the first VPN connection and associate the second VPN connection with the first VPN connection when the session identification data is received from a client device, in accordance with the techniques described herein. The memory 240 may comprise read only memory (ROM), random access memory (RAM), magnetic disk storage media devices, optical storage media devices, FLASH memory devices, electrical, optical, or other physical/tangible memory storage devices.

The functions of processor 230 may be implemented by logic encoded in one or more tangible computer readable media (e.g., embedded logic such as an application specific integrated circuit, digital signal processor instructions, software that is executed by a processor, etc), wherein memory 240 stores data used for the operations described herein and stores software or processor executable instructions that are executed to carry out the operations described herein.

The protocol agile connection management process logic 400 may take any of a variety of forms, so as to be encoded in one or more tangible computer readable memory media or storage device for execution, such as fixed logic or programmable logic (e.g., software/computer instructions executed by a processor) and the processor 230 may be an application specific integrated circuit (ASIC) that comprises fixed digital logic, or a combination thereof. For example, the processor 230 may be embodied by digital logic gates in a fixed or programmable digital logic integrated circuit, which digital logic gates are configured to perform the protocol agile connection management process logic 400. In another form, the protocol agile connection management process logic 400 may be embodied in one or more computer readable storage media encoded with software comprising computer executable instructions and when the software is executed operable to perform the operations described herein for the process logic 400.

Figure 3:
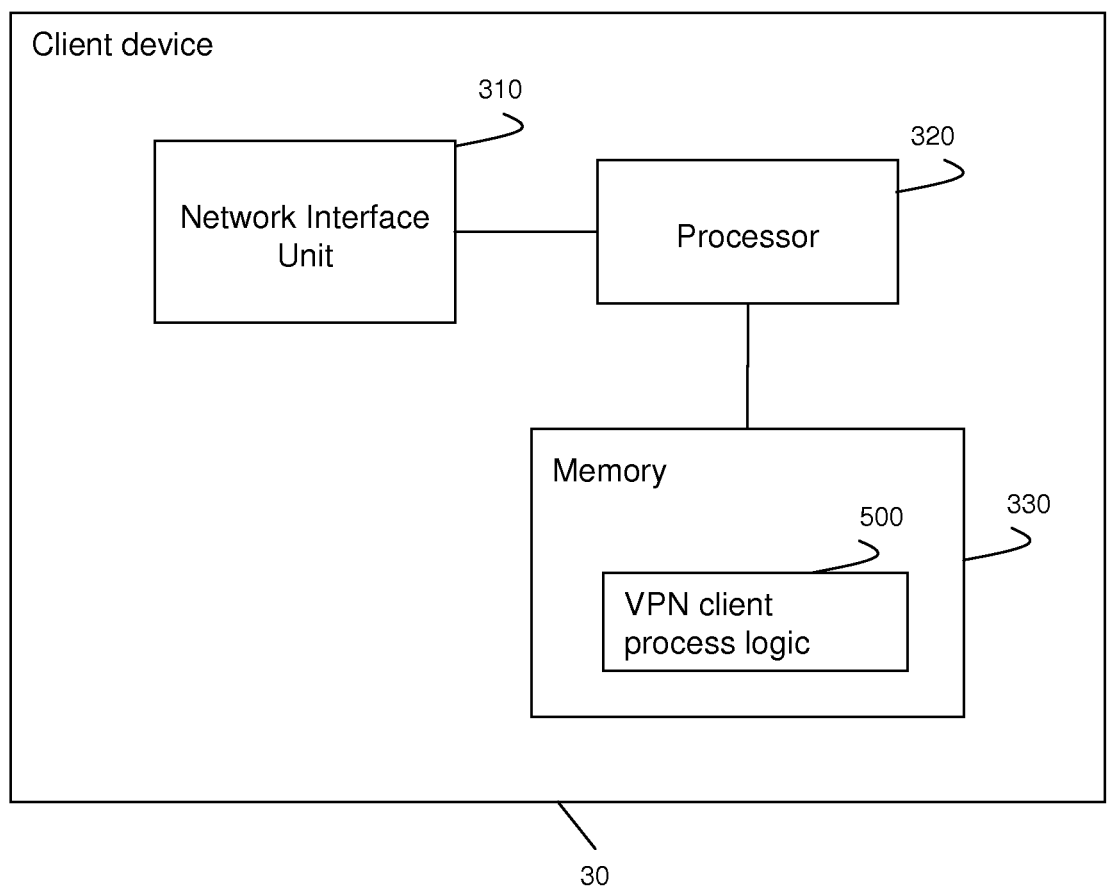
FIG. 3 is an example of a block diagram of the client device that is configured with VPN client process logic to initiate multiple VPN connections with multiple communication protocols.

Turning to FIG. 3, an example block diagram of the client device 30 is now described. In FIG. 3, the client device 30 has a network interface unit 310, a processor 320 and a memory 330. The network interface unit 310 is configured to enable communications over either a wired network, e.g., network 90 or a wireless network, e.g., wireless access network 100. For example, the network interface unit 310 comprises an Ethernet card for wired network communications and a WiFi™ card for wireless local area network communications and optionally a wireless wide area network (WWAN) card for WWAN network connectivity. The processor 320 of the client device 30 is a microprocessor or microcontroller similar to processor 230 in the gateway device 20. Processor 320 is configured to execute program logic instructions (i.e., software) for carrying out various operations and tasks described herein. For example, the processor 320 of the client device 30 is configured to execute the VPN client process logic 500 that is stored in memory 330. In general, the VPN client process logic 500 enables processor 320 to select a first communication protocol, initiate a first VPN connection using the first communication protocol, determine whether the first VPN connection has been disrupted, select a second communication protocol in response to the disruption and initiate a second VPN connection using the second communication protocol, according to the techniques described herein. The memory 330 is similar to memory 240 of the gateway device and may comprise ROM, RAM, magnetic disk storage media devices, optical storage media devices, FLASH memory devices, electrical, optical, or other physical/tangible memory storage devices.

The functions of processor 320 may be implemented by logic encoded in one or more tangible computer readable media (e.g., embedded logic such as an application specific integrated circuit, digital signal processor instructions, software that is executed by a processor, etc), wherein memory 330 stores data used for the operations described herein and stores software or processor executable instructions that are executed to carry out the operations described herein.

The VPN client process logic 500 may take any of a variety of forms, so as to be encoded in one or more tangible computer readable memory media or storage device for execution, such as fixed logic or programmable logic (e.g., software/computer instructions executed by a processor) and the processor 320 may be ASIC that comprises fixed digital logic, or a combination thereof. For example, the processor 320 may be embodied by digital logic gates in a fixed or programmable digital logic integrated circuit, which digital logic gates are configured to perform the VPN client process logic 500. In another form, the VPN client process logic 500 may be embodied in one or more computer readable storage media encoded with software comprising computer executable instructions and when the software is executed operable to perform the operations described herein for the process logic 500.

As stated above, and with reference to FIG. 1, if the first VPN connection 70 between the gateway device 20 and the client device 30 is disrupted, the client device 30 can initiate a second VPN connection 80 between the gateway device 20 and the client device 30. Alternatively, the client device 30, in response to a disruption in the first VPN connection 70, can attempt to re-establish the first VPN connection. In both situations, session identification information that was passed between the gateway device 20 and the client device 30 during the establishment of the first VPN connection 70 may be used to re-establish the first VPN connection 70 or to initiate the second VPN connection 80 and associate the second VPN connection with the first VPN connection, according to the techniques described herein.

Figure 4A:
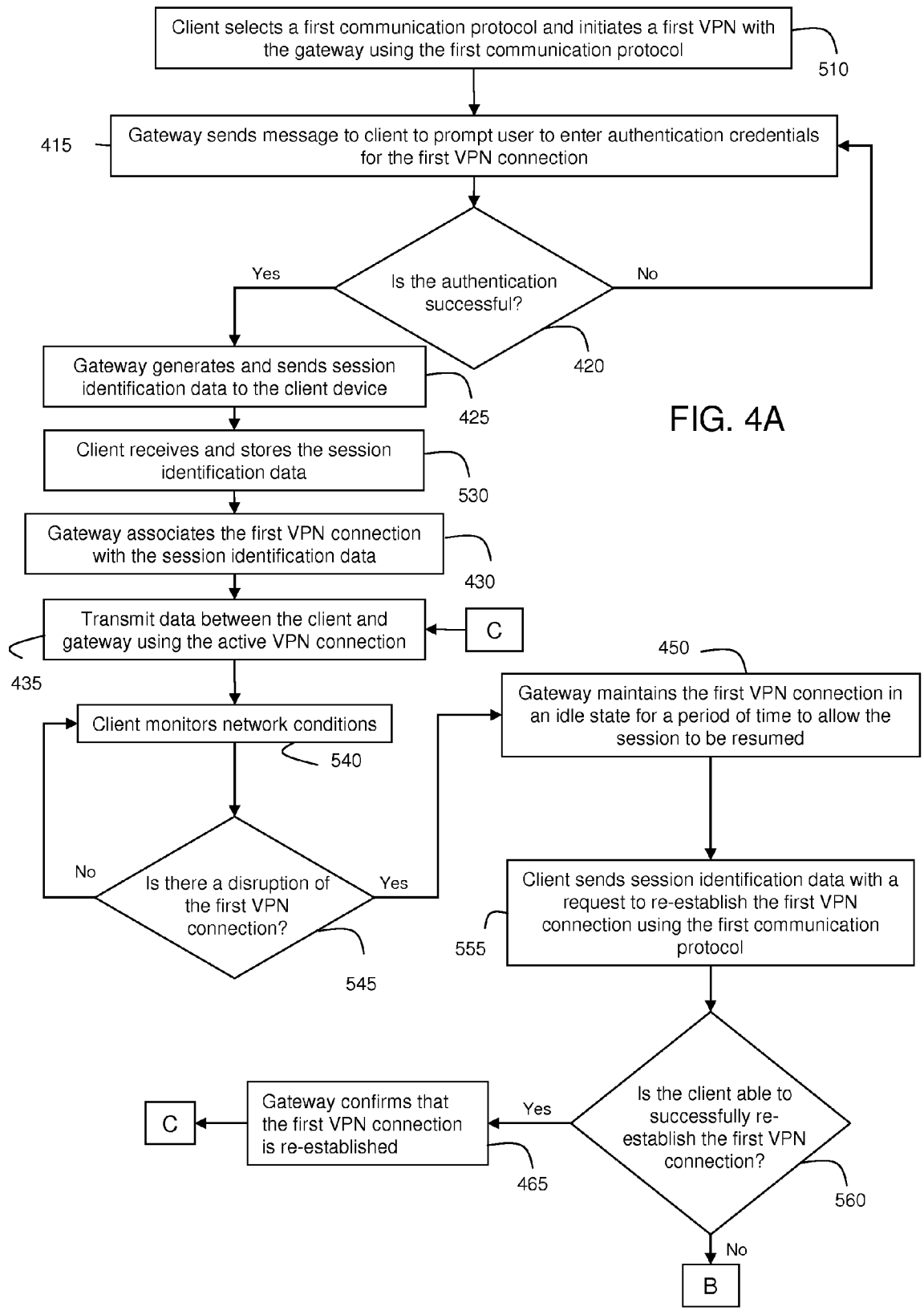

Reference is now made to FIGS. 4A and 4B for a description of a flow chart that depicts how the protocol agile connection management process logic 400 of the gateway device 20 and the VPN client process logic 500 of the client device 30 establish a VPN connection and attempt to re-establish the VPN connection in response to a connection disruption. It should be noted that FIGS. 4A and 4B describe operations for both the gateway device 20 and the client device 30. Accordingly, the operations in FIGS. 4A and 4B with reference numerals in the 400's are operations performed by the gateway device 20, and the operations with reference numerals in the 500's are operations performed by the client device 30.

At 510, the client device 30 initiates a first VPN connection with the gateway device 20 using a first communication protocol. The first communication protocol may be any secure protocol for establishing secure data communication between the gateway device 20 and the client device 30. For example, the first communication protocol may be an SSL protocol or an IKEv2/IPsec protocol.

After the first VPN connection is initiated, at 415 the gateway device 20 sends a message to the client device 30 to prompt a user at the client device 30 to enter authentication credentials for the first VPN connection, which are then sent from the client device 30 to the gateway device 20. Once the gateway device 20 receives the authentication credentials from the client device 30, at 420 the gateway device determines whether the authentication is successful. If the authentication is not successful (e.g., if the authentication credentials received at the gateway device 20 are not valid), then at 415 the user at the client device 20 may be prompted to re-enter the authentication credentials.

When the authentication is successful (e.g., if the authentication credentials received at the gateway device 20 are valid), the gateway device 20, at 425, generates and sends session identification data to the client device 30. For example, the processor 230 of the gateway device 20 may generate identification data that comprises a session identifier and a session token and may send the session identifier or the session token, or both, to the client device 30. At 530, the client device 30 receives and stores (caches) the session identification data sent by the gateway device 20 at 425. After generating and sending the session identification data to the client device 30, the processor 230 of the gateway device 20, at 430, stores data that associates the first VPN connection with the session identification data sent at 425. At operation 435, the gateway device 20 and the client device 30 transmit data securely to each other using the first VPN connection.

Data continues to be transmitted securely between the client device 30 and the gateway device 20 while the client device 30, at 540, monitors network conditions between the gateway device 20 and the client device 30. Based on the monitoring, the processor 320 of the client device 30, at 545, determines whether there is a disruption of the first VPN connection. Examples of techniques to monitor the network conditions and detect a disruption include monitoring the number of packet re-transmission requests and detecting an increase beyond a threshold, monitoring the number of packets that are not acknowledged, etc. In another example, the client device 30 periodically sends a keep-alive message to the gateway device 20 and expects to receive a response message from the gateway device 20 after the gateway device 20 receives the keep-alive message. If the client device 20 does not receive a response message from the gateway device 20, the client device 30 resends the keep-alive message to the gateway device 20. If the client device 30 still does not receive a response message from the gateway device 20, the client device 30, after a predetermined number of attempts, determines that there is a disruption in the first VPN connection. Similarly, in another example, the gateway device 20 periodically sends a keep-alive message to the client device 30, and expects a response message from the client device 30 after the client device 30 receives the keep-alive message. If the gateway device 20 does not receive a response message from the client device 30 after a predetermined number of attempts to send the keep-alive message, the gateway device 20 maintains the first VPN connection in an idle state.

If there is no disruption of the first VPN connection, the gateway device 20 and the client device 30 continue to transmit data securely across the first VPN connection, while the processor 320 of the client device 30 continues to monitor the network conditions. If there is a disruption of the first VPN connection (e.g., if the client device 30 detects network conditions indicating a disruption of the first VPN connection), then the processor 230 of the gateway device 20, at 450, maintains the first VPN connection in an idle state, as described above, for example, for a period of time to allow the session to be resumed, while at 555, the client device 30 sends session identification data (received from the gateway device 20 at 425) to the gateway device 20 with a request to re-establish the first VPN connection using the first communication protocol. Operation 555 may be performed prior to operation 450 so that the gateway device 20 puts the first VPN connection in the idle state in response to receiving the request to re-establish the first VPN connection. In one example, the session identification data and the request to re-establish the first VPN connection is sent by the client device 30 to the gateway device 20 without requiring any user interaction at the client device 30. That is, the user at the client device 30 need not perform any action to send the request to re-establish the VPN connection. At 560, the client device 30 determines whether the first VPN connection can be re-established, and if so, the client device 30 re-establishes the first VPN connection. The gateway device 20, at 465, confirms that the first VPN session is re-established and reverts to operation 435 where the gateway device 20 and client device 30 transmit data securely to each other using the first VPN connection.

If at 560 it is determined that the first VPN connection cannot be re-established, the client device 30 initiates a second VPN connection using a second communication protocol. Reference is now made to FIG. 4B for a description of how the client device 30 establishes the second VPN connection.

At 570, in response to determining at 560 that the first VPN connection cannot be re-established, the processor 320 of the client device 30 initiates a second VPN connection to the gateway device 20 using a second communication protocol. As with the first communication protocol, the second communication protocol may be any secure protocol for establishing secure data communication between the gateway device 20 and the client device 30. For example, the second communication protocol may be an SSL protocol or an IKEv2/IPsec protocol. In one example, the second communication protocol is a secure communication protocol that is different than the secure protocol used for the first communication protocol. In other words, for example, if the first VPN connection utilized an SSL protocol, the second VPN may utilize an IKEv2/IPsec protocol, and vice versa.

After initiating the second VPN connection, the processor 230 of the gateway device 20, at 475, receives the cached session identification data sent from the client device 30 over the second VPN connection. This session identification data is used as authentication credentials for the client device 30 on the second VPN connection. This cached session identification data may be, for example, the session identifier or the session token, or both, generated by the gateway device 20 and sent to the client device 30 at 425 of FIG. 4A. For example, if the first VPN connection was established using an SSL protocol and the second VPN connection is initiated using an IKEv2/IPsec protocol, the session identifier and session token may be used for authenticating the client device 30 on the second VPN connection via IKE pre-shared key (PSK) techniques. The cached session identification data (e.g., the session identifier and session token) may be sent from the client device 30 at 570 without requiring any user interaction at the client device 30. The cached session identification data received by the gateway device 20 can further be used to correlate the second VPN connection attempt to the existing, idle first VPN connection.

After receiving the cached session identification data from the client device 20, the processor 230 of the gateway device 20, at 480, determines whether the authentication of the session identification data is successful. If the authentication is not successful, the gateway device 20, at operation 485, closes the first VPN connection that the gateway device 20 kept as an idle session in step 450 of FIG. 4A. The gateway device 20 may perform this authentication by using a full handshake exchange between the client device 30 and the gateway device 20. If the authentication is successful, the processor 230 of the gateway device 20, at operation 490, associates the second VPN connection with the disrupted first VPN connection using the cached session identification received at the gateway device 20 from the client device 30. Data communication is then resumed between the client device 30 and the gateway device 20 to enable secure data transmission over the second VPN connection.

Thus, the processor 230 of the gateway device 20 enables protocol agility between the first communication protocol and the second communication protocol based on the network conditions. Accordingly, multiple secure communication protocols can be used to resume secure data communications between a client device 30 and a gateway device 20 in response to a disruption in the initial communication session. Such protocol agility also allows for secure communications between the client device 30 and the gateway device 20 to continue without requiring user interaction, while also associating the new, second VPN connection with the existing, idle first VPN connection.

Though the foregoing application refers to data communications between a gateway device 20 and a client device 30, it should be appreciated that the techniques described herein can be used for communications between any two network devices. For example, a first device can perform the processes that are described above with respect to the gateway device 20, and a second device can perform the processes that are described above with respect to the client device 30. In one example, in a peer-to-peer VPN connection between the first device and the second device using a server for session traversal utilities for network address translators (STUN), the protocol agile techniques may be employed between a first communication protocol of a first VPN connection and a second communication protocol of a second VPN connection, as described above. In this example, in response to a disruption of the first VPN connection, communications between the first device and the second device can fall back to the second VPN connection (with the second communication protocol). Likewise, communications between the first and second devices can later fall forward to the first VPN connection (with the first communication protocol) if the first VPN connection is re-established.

In sum, a method is provided comprising: generating at a first device session identification data that is associated with a first virtual private network connection between the first device and a second device using a first communication protocol; sending the session identification data from the first device to the second device over the first private network connection; receiving the session identification data at the first device from the second device over a second virtual private network connection; and associating the second virtual private network connection with the first virtual private network connection using the session identification data.

Additionally, a method is provided comprising: initiating a first virtual private network connection with a first device at a second device and selecting at the second device a first communication protocol to be used for the first virtual private network connection; receiving session identification data associated with the first virtual private network connection from the first device over the first virtual private network connection and storing the session identification data at the second device; determining whether the first virtual private network connection has been disrupted; selecting a second communication protocol and initiating a second virtual private network connection with the first device using the second communication protocol if the first virtual private network connection has been disrupted; and transmitting the session identification data associated with the first virtual private network from the second device to the first device over the second virtual private network.

Additionally, one or more computer readable storage media is provided that is encoded with software comprising computer executable instructions and when the software is executed operable to: generate session identification data associated with a first virtual private network connection between first device and a second device using a first communication protocol; send the session identification data to the second device over the first private network connection; receive the session identification data from the second device over a second virtual private network connection; and associate the second virtual private network connection with the first virtual private network connection using the session identification data.

Furthermore, an apparatus is provided comprising: a network interface device configured to enable communications over a network; and a processor coupled to the network interface device. The processor is configured to: generate session identification data associated with a first virtual private network connection with a client device using a first communication protocol; send the session identification data to the client device over the first private network connection; receive the session identification data from the client device over a second virtual private network connection; and associate the second virtual private network connection with the first virtual private network connection using session identification data.

Further still, an apparatus is provided comprising a network interface device configured to enable communications over a network; and a processor coupled to the network interface device. The processor is configured to select a first communication protocol and initiate a first virtual private network connection with a gateway device using the first communication protocol; receive session identification data associated with the first virtual private network connection from the gateway device over the first virtual private network connection and store the session identification data; determine whether the first virtual private network connection is disrupted; select a second communication protocol and initiate a second virtual private network connection with the gateway device using the second communication protocol when it is determined that the first virtual private network connection is disrupted; and transmit the session identification data to the gateway device over the second virtual private network connection.

The above description is intended by way of example only. Various modifications and structural changes may be made therein without departing from the scope of the concepts described herein and within the scope and range of equivalents of the claims.

What is claimed is:

1. A method comprising:
generating at a first device session identification data that is associated with a first virtual private network connection between the first device and a second device using a first secure communication protocol;
sending the session identification data from the first device to the second device over the first virtual private network connection;
receiving the session identification data at the first device from the second device over a second virtual private network connection using a second secure communication protocol;
at the first device, associating the second virtual private network connection with the first virtual private network connection using the session identification data after the second device is authenticated for the second virtual private network connection; and
authenticating the second device at the first device using the session identification information received from the second device over the second virtual private network connection.

2. The method of claim 1, wherein authenticating comprises authenticating the second device at the first device using a full handshake exchange between the first device and the second device.

3. The method of claim 1, wherein generating comprises generating identification data that comprises a session identifier and a session token.

4. The method of claim 1, and further comprising at the second device: determining whether the first virtual private network connection is disrupted; selecting the second secure communication protocol and initiating the second virtual private network connection with the first device using the second secure communication protocol when it is determined that the first virtual private network connection is disrupted; and transmitting the session identification data to the first device over the second virtual private network connection.

5. A method comprising:
initiating a first virtual private network connection with a first device at a second device and selecting at the second device a first secure communication protocol to be used for the first virtual private network connection;
receiving session identification data associated with the first virtual private network connection at the second device from the first device over the first virtual private network connection and storing the session identification data at the second device;
at the second device, determining whether the first virtual private network connection is disrupted;
at the second device, selecting a second secure communication protocol and initiating a second virtual private network connection with the first device using the second secure communication protocol when it is determined that the first virtual private network connection is disrupted;
transmitting the session identification data from the second device to the first device over the second virtual private network connection;
receiving the session identification data at the first device from the second device over the second virtual private network connection; and
at the first device, associating the second virtual private network connection with the first virtual private network connection using the session identification data.

6. The method of claim 5, wherein selecting the first secure communication protocol comprises selecting a Secure Socket Layer protocol and wherein selecting the second secure communication protocol comprises selecting an Internet Key Exchange over Internet Protocol Security protocol.

7. The method of claim 5, wherein selecting the first secure communication protocol comprises selecting an Internet Key Exchange over Internet Protocol Security protocol and wherein selecting the second secure communication protocol comprises selecting a Secure Socket Layer protocol.

8. The method of claim 5, wherein transmitting comprises transmitting the session identification data to the first device without requiring user interaction at the second device.

9. The method of claim 5, further comprising attempting to re-establish the first virtual private network connection if the first virtual private network connection has been disrupted, and wherein selecting the second secure communication protocol, initiating the second virtual private network connection and transmitting the session identification data operations are performed when the attempt to re-establish the first virtual private network connection is not successful.

10. The method of claim 5, wherein determining comprises determining whether the first virtual private network connection has been disrupted by evaluating network conditions to detect a disruption in the first virtual private network connection.

11. One or more non-transitory computer readable storage media encoded with software comprising computer executable instructions and when the software is executed operable to:
generate session identification data associated with a first virtual private network connection between a first device and a second device using a first secure communication protocol;
send the session identification data to the second device over the first virtual private network connection;
receive the session identification data from the second device over a second virtual private network connection using a second secure communication protocol;
associate the second virtual private network connection with the first virtual private network connection using the session identification data after the second device is authenticated for the second virtual private network connection; and authenticate the second device at the first device using the session identification information received from the second device over the second virtual private network connection.

12. The computer readable storage media of claim 11, wherein the instructions that are operable to authenticate the second device comprise instructions that are operable to authenticate the second device at the first device using a full handshake exchange between the first device and the second device.

13. The computer readable storage media of claim 11, wherein the instructions that are operable to generate session identification data comprises instructions that are operable to generate identification data that comprises a session identifier and a session token.

14. An apparatus comprising:
a network interface device configured to enable communications over a network; and
a processor coupled to the network interface device and configured to:
generate session identification data associated with a first virtual private network connection with a client device using a first secure communication protocol;
send the session identification data to the client device over the first virtual private network connection;
receive the session identification data from the client device over a second virtual private network connection using a second secure communication protocol;
associate the second virtual private network connection with the first virtual private network connection using the session identification data after the client device is authenticated for the second virtual private network connection; and
authenticate the client device using the session identification information received from the client device over the second virtual private network connection.

15. The apparatus of claim 14, wherein the processor is further configured to authenticate the client device using a full handshake exchange with a client device.

16. The apparatus of claim 14, wherein the processor is further configured to generate identification data that comprises a session identifier and a session token.

17. An apparatus comprising:
a network interface device configured to enable communications over a network; and
a processor coupled to the network interface device and configured to:
select a first secure communication protocol and initiate a first virtual private network connection with a gateway device using the first communication protocol;
receive session identification data associated with the first virtual private network connection from the gateway device over the first virtual private network connection and store the session identification data;
determine whether the first virtual private network connection is disrupted;
select a second secure communication protocol and initiate a second virtual private network connection with the gateway device using the second secure communication protocol when it is determined that the first virtual private network connection is disrupted;
transmit the session identification data to the gateway device over the second virtual private network connection;
receive the session identification data at the first device from the second device over the second virtual private network connection; and
associate the second virtual private network connection with the first virtual private network connection using the session identification data.

18. The apparatus of claim 17, wherein the processor is configured to transmit the session identification data to the gateway device without requiring user interaction at the client device.

\* \* \* \* \*